US012755167B2

(12) United States Patent
Noto et al.

(10) Patent No.: US 12,755,167 B2
(45) Date of Patent: Oct. 6, 2026

(54) METHOD FOR DYNAMIC RULE-BASED RECOMMENDATION VALIDATION

(71) Applicant: Dell Products L.P., Round Rock, TX (US)

(72) Inventors: Nicholas A. Noto, Saratoga, CA (US); Nitin Madan, Cupertino, CA (US); Jingwen Zhang, Milpitas, CA (US); Sriranjani Vaidyanathan, Santa Clara, CA (US); Ishan Khaparde, Milpitas, CA (US)

(73) Assignee: Dell Products L.P., Round Rock, TX (US)

(*) Notice: Subject to any disclaimer, the term of this patent is extended or adjusted under 35 U.S.C. 154(b) by 830 days.

(21) Appl. No.: 18/178,871

(22) Filed: Mar. 6, 2023

(65) Prior Publication Data

US 2024/0303510 A1 Sep. 12, 2024

(51) Int. Cl.
*G06N 5/025* (2023.01)
*G06F 3/06* (2006.01)

(52) U.S. Cl.
CPC ........... *G06N 5/025* (2013.01); *G06F 3/0604* (2013.01); *G06F 3/0644* (2013.01); *G06F 3/0673* (2013.01)

(58) Field of Classification Search
CPC ..... G06N 5/025; G06F 3/0604; G06F 3/0644; G06F 3/0673; G06F 3/067
USPC .......................................................... 711/101
See application file for complete search history.

(56) References Cited

U.S. PATENT DOCUMENTS

2020/0175120 A1* 6/2020 Bandyopadhyay ....... G06F 8/43
2024/0078216 A1* 3/2024 Evers .................... G06F 16/214

* cited by examiner

*Primary Examiner* — Hua J Song
(74) *Attorney, Agent, or Firm* — Workman Nydegger

(57) ABSTRACT

Dynamic rule-based recommendations are disclosed. A rule-base, which includes rules, is received for a data-related operation. Potential targets of the data-related operation are validated against the rule-base. Targets that are eligible or validated using the rule-base may be returned and/or ranked. The data-relation operation may be performed using one of the validated targets.

15 Claims, 7 Drawing Sheets

METHOD FOR DYNAMIC RULE-BASED RECOMMENDATION VALIDATION

FIELD OF THE INVENTION

Embodiments of the present invention generally relate to recommendation systems. More particularly, at least some embodiments of the invention relate to systems, hardware, software, computer-readable media, and methods for validating rule-based recommendations that are related to performing data related operations.

BACKGROUND

Computing systems, including data protection systems, often include or have access to a storage system. The ability to use the storage system effectively, however, is more challenging. More specifically, the storage system may include several storage units or appliances (or other devices) Effectively using the storage system may depend on the capabilities, status, and other characteristics of the storage units. One of the difficulties in using the storage units of a storage system efficiently relates to managing how and where data is stored.

A user may discover, over time, that some of the storage units are nearly full while others are hardly used. Storage units become unbalanced for a variety of different reasons. Compression and deduplication operations, for example, may impact the extent to which the storage units of a storage system are imbalanced. The location at which data is originally placed in the storage system may also impact the extent to which the storage units are imbalanced. Regardless, the fact that storage systems become imbalanced or is imbalanced indicates that placing new data into the storage system and balancing the existing data across the storage units in these storage systems is challenging.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to storage systems and to data placement and data migration in storage systems. More particularly, at least some embodiments of the invention relate to systems, hardware, software, computer-readable media, and methods for migrating and/or placing data in the storage of a computing system such as a data protection system.

A data protection system may be configured to generate backups of a source system. The dataset (e.g., backups or namespaces) generated by the data protection system may be stored on a target system. Part of the data protection operation, such as a backup operation, may include identifying the target system in which to place the dataset. Other examples of data protection operations include, but are not limited to, placement operations and migration operations.

Embodiments of the invention allow the data protection system to consider rules, which may be user defined, that can be used to identify a target system. The data protection system may access the rules, which may be stored as a rule-base, and validate the rules in the context of the present operation. Validating the rules may include evaluating the rules against the target systems. The target systems that pass the rules are validated target systems for the present operation. In some examples, the validated target systems may be ranked.

The rule-base allows target systems to be validated for operations such as placement operations and migration operations. The rules allow the target systems to be assessed based on user-defined requirements and conditions. Further, the operation can be performed in a manner that more effectively uses the storage system. For example, if the validated target systems are ranked based on available storage, this allows the target system with the most available storage to be selected for the placement operation.

Figure 1:
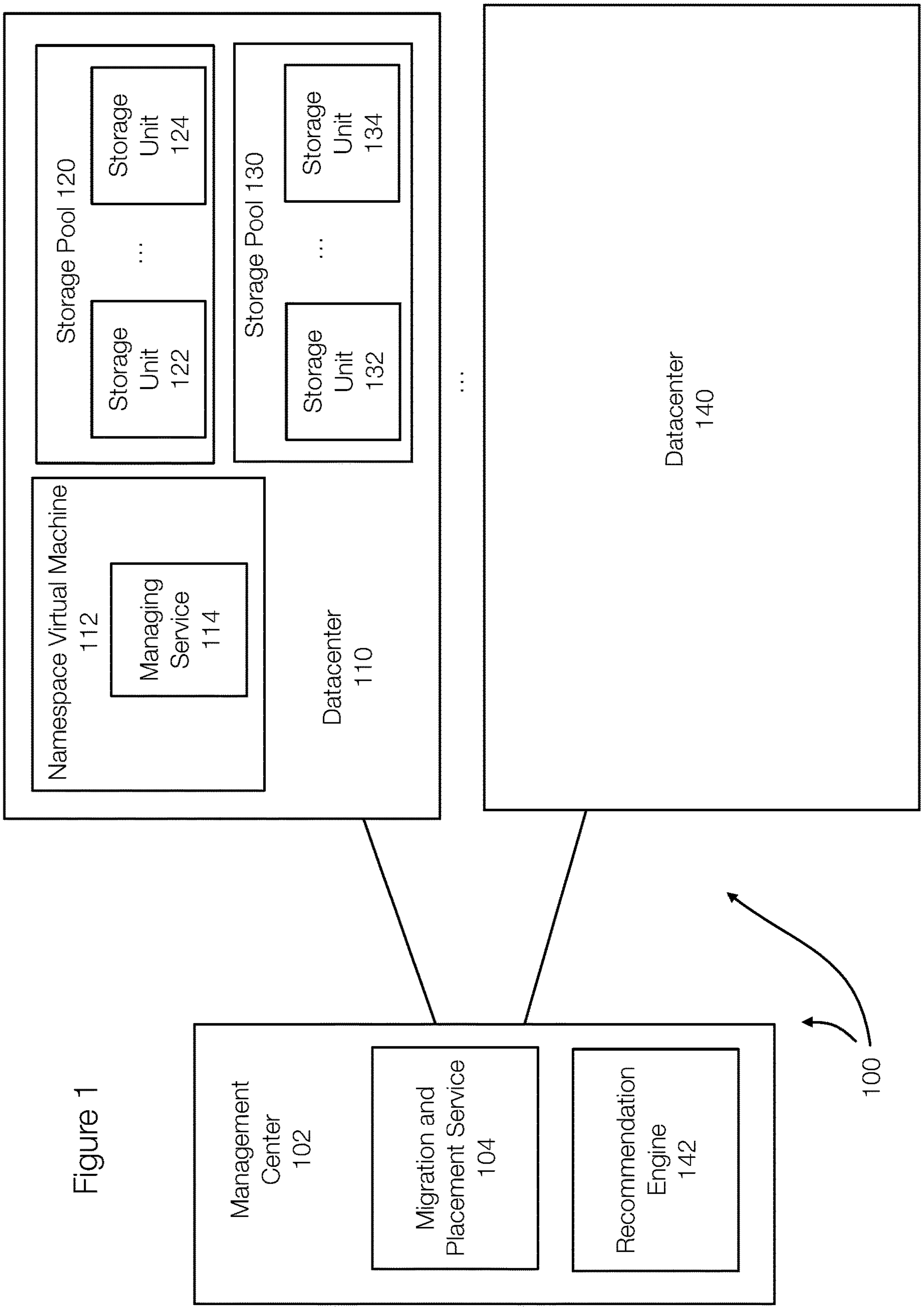
FIG. 1 discloses aspects of a storage system.

FIG. 1 discloses aspects of a storage system in which data placement and/or data migration may be implemented. The storage system 100 may include storage associated with a data protection system, a database system, a datacenter, an edge system, or the like. Embodiments of the invention are discussed in the context of a data protection system and in the context of placing/migrating data such as backups, namespaces, or the like.

In one example, a namespace may include a logical partition of a file system. The namespace may have a unique name. An MTree, such as associated with DellEMC Data Domain and PowerProtect Data Domain, is an example of a namespace. PowerProtect Data Domain is an example of a data protection system and PowerProtect Data Domain Management Center is an example of a system that may be configured to manage multiple data protection systems.

FIG. 1 illustrates a management center 102, which may be implemented on or as a virtual machine, a physical machine, a container, or the like. The management center 102 may include processors, memory, and other computing hardware. The management center 102 may manage multiple data protection systems, represented by datacenters 110 and 140. The datacenter 110 may include a namespace virtual machine 112 that includes or provides a managing service 114. The managing service 114 may interact with the management center 102 to manage the datacenter 110.

The datacenter 110 may include multiple storage pools, represented by storage pools 120 and 130. The storage pool 120 may include storage units represented by storage units 122 and 124. The storage pool 130 may include storage devices represented by storage units 132 and 134. A DDR (Data Domain Restorer) is an example of a storage unit. Thus, backups, namespaces or other data may be placed within a storage unit or migrated from one storage unit to another storage unit. The storage units 122, 124, 132, and 134 may include storage devices (e.g., disk drives), controllers, and/or other hardware. The datacenter 140 may be configured similarly to the datacenter 110.

The management center 102 may include a migration and placement service 104. Clients of the management center 102 may interact with the management center 102 to place datasets such as namespaces or backups into one of the datacenters and more specifically into one of the storage units in one of the storage pools.

Embodiments of the invention use rules to place datasets (e.g., backups, snapshots, replicas, or the like). More specifically, the management center 102 may receive a rule-base (e.g., a collection of rules) from a user or client. Alternatively, the management center 102 may access the rule-base from a particular location. The rule-base may specify aspects of the data placement operation or data migration operation to be performed. The migration and placement service (MPS) 104 is configured to perform a validation operation that evaluates the rule-base against relevant storage units. The rule validation operation is performed, in one example, to identify a storage unit as a target for the placement/migration operation. In one example, the MPS 104 may return a sorted list of recommended targets. The targets included in the sorted list may be ranked. In one example, the MPS 104 may include or have access to a recommendation engine 142 configured to perform the validation operation.

The recommendation engine 142 may be configured to query the datacenters 110 and 140 or the management center 102 as necessary to validate the rules in the rule-base. More specifically, the recommendation engine 142 may be configured to process the incoming systems (e.g., the storage units in the storage pools), parse and evaluate their data/characteristics against the rule-base, and determine their recommendation eligibility. This indicates that some targets may not be eligible for recommendation. Validating a rule-base allows eligible targets to be selected and ranked. The data protection operation (e.g., a data placement operation or a data migration operation) can select one of the eligible targets and perform the data protection operation. Because rule-bases may vary, the list of targets may change. The list of targets may also change due to changes in the targets themselves. For example, a target that has recently been used to storage multiple datasets has less storage available and may be disqualified as a target for subsequent validation operations.

Figure 2A:
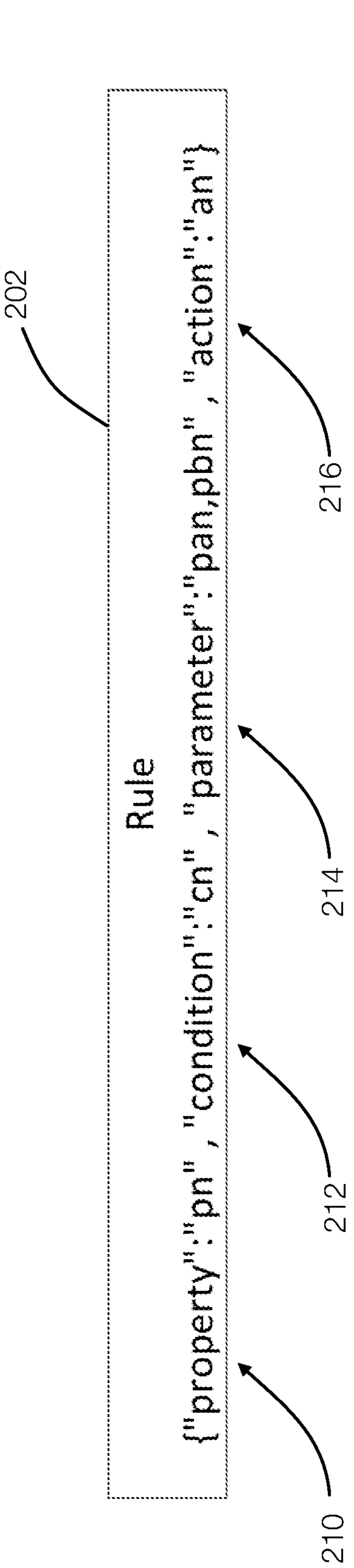
FIG. 2A discloses aspects of a rule that may be included in a rule-base.

FIG. 2A discloses aspects of a rule. The rule 202 is generally configured to encapsulate a single logical check for specified fields or data along with a resulting issue enumeration and severity if validating the rule fails. The rule 202 in FIG. 2A, for example includes a property 210, a condition 212, a parameter 214, and an action 216.

Figure 2B:
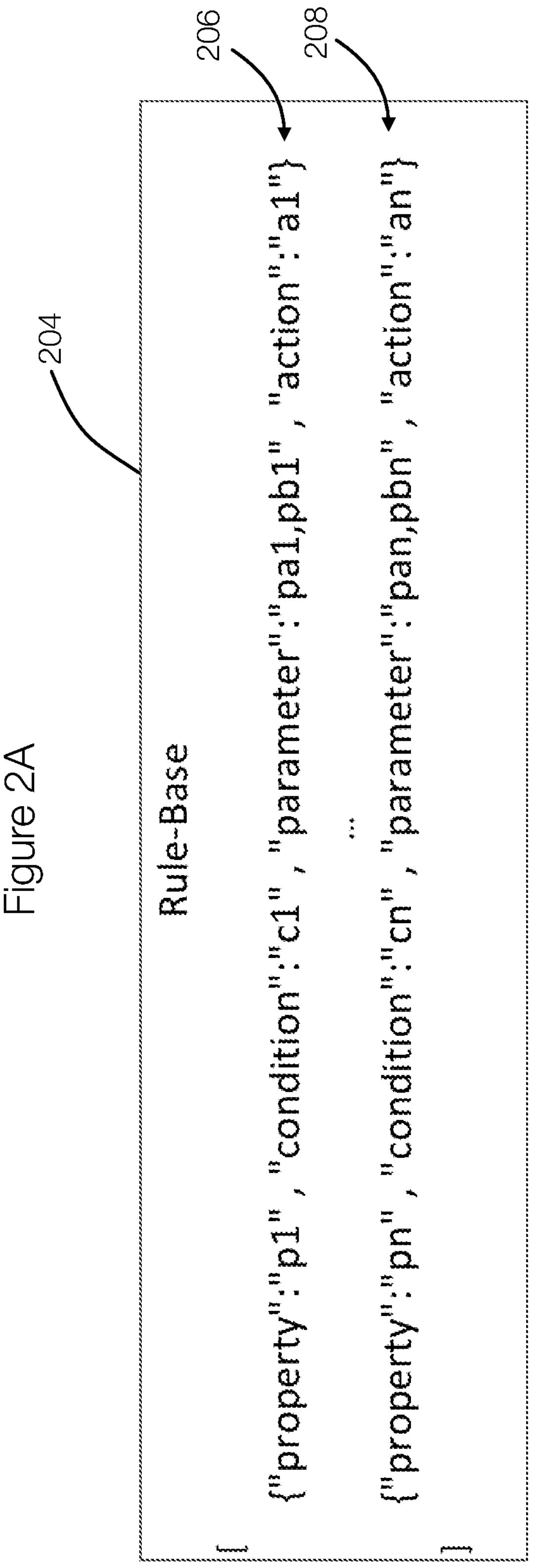
FIG. 2B discloses aspects of a rule-base that includes one or more rules.

FIG. 2B discloses aspects of a rule-base. A rule-base 204 may include multiple rules, represented by the rules 206 and 208.

Embodiments of the invention relate to accepting and processing dynamic user-provided validation rules. Embodiments of the invention allow a rule-base to be accepted in order to generate recommendations for placing/migrating a dataset such as a backup. The rule 202 may specify fields, parameters, values specified by the parameters, or the like. The fields, parameters, and the like may be generally referred to as values. The recommendation engine may require access to these values in order to validate the rules and generate placement/migration recommendations. Plugin routines may be generated or used to pass the rule-base (or the data therein and associated values) to the recommendation engine.

A rule-base, such as the rule-base 204, may be used to perform a logical check. Checking or validating a rule determines whether a target complies with the rule. Targets that comply with all of the rules in the rule-base 204 may be eligible for recommendation. The rule-base should contain sufficient information to handle both the logical checks and the outcomes of the logical checks. The condition 212 and the parameter 214 fields are configured to be encapsulate these logical checks while allowing for the use of external data.

The parameter 214 may reference the data to be used for the condition 212, which may come in the form of a variable name, a nested value within an object structure, or the like. The property 210 and action 216 are configured to handle the outcome of the logical check performed using the condition 212 and the parameter 214. The property 210 specifies the issue that would result if the logical check fails. The issue classification may be used for logging, reporting, or other issue handling mechanisms based on the property 210 and its associated severity, which is specified by the action 216. In some examples, the severity of issues may vary. Some issues may warrant a warning (WARN) while others (ERR) may be severe enough to merit disqualification. Embodiments of the invention thus allow an action to be specified that accounts for various levels of severity.

An example of the rule 202 may be expressed as follows:

{"property":"INSUFFICIENT PHYSICAL CAPACITY AVAILABLE", "condition":"a<=(b/2)", "parameter": "capacity.system, su.logicalCapacity", "action": "ERR"}

The property 210 includes an enumeration used for denoting an issue raised if the target system fails to pass the condition 212 of the rule 202. In this case, the rule 202 is related to ensuring that the target device has sufficient physical capacity as specified by the condition 212. The issue may be a critical error a warning depending on the severity of the given issue as defined by the action 216. In effect, this example of the rule evaluates the target to determine whether the target has sufficient physical capacity. In this context, sufficient physical capacity may indicate sufficient to store the relevant dataset or sufficient to store the dataset plus an additional margin.

The parameter 214 may include a list (e.g., a comma separated list) of field names, variable names, or values to be used for comparison or validation by the condition 212. The parameters 214 may represent data retrieved from a variety of sources that may be separate from the data passed in the recommendation request or in the rule 202. In this example, capacity.system and su.logicalcapacity are the parameters that are passed to the recommendation engine.

The condition 212 may define a logical condition to be evaluated or checked. In this example, this suggests that the capacity.system is parameter a and su.logicalcapacity is parameter b. This example uses letters as a reference to variables but embodiments of the invention are not limited to this representation and may use other representations. For example, if letters are used and a complex rule requires more than 26 variables, the parameters could be extended to multiple character representation such as aa or a1.

A complete condition is defined as the condition 212 matched with the associated parameters 214. More specifically, the example of the rule 202 set forth above includes a complete condition that can be expressed, instead of "a<=(b/2)", as "capacity.system<=(su.logicalcapacity/2)". This rule assumes that the "capacity" and "su" objects are available for the resource (the target) being evaluated for recommendation and have attributes called "system" and "logicalcapacity" respectively. Attributes nested deeper in an object structure may also be provided as parameters as needed. If the complete condition, when evaluated, is false or fails, the resource or target being evaluated for recommendation is deemed ineligible because the action of the rule is disqualifying (ERR) in this example. The resource will also be tagged with the issue enumeration defined by the property, which is insufficient physical capacity available in this example.

The action 216 may denote, by way of example and not limitation, whether the resulting property 210 is a critical error (ERR) or a warning (WARN) if the condition 212 fails. In this example, the action 216 is ERR. This indicates that if the rule 202 fails, the target system is disqualified from being recommended as a target for the data protection operation.

Figure 3:
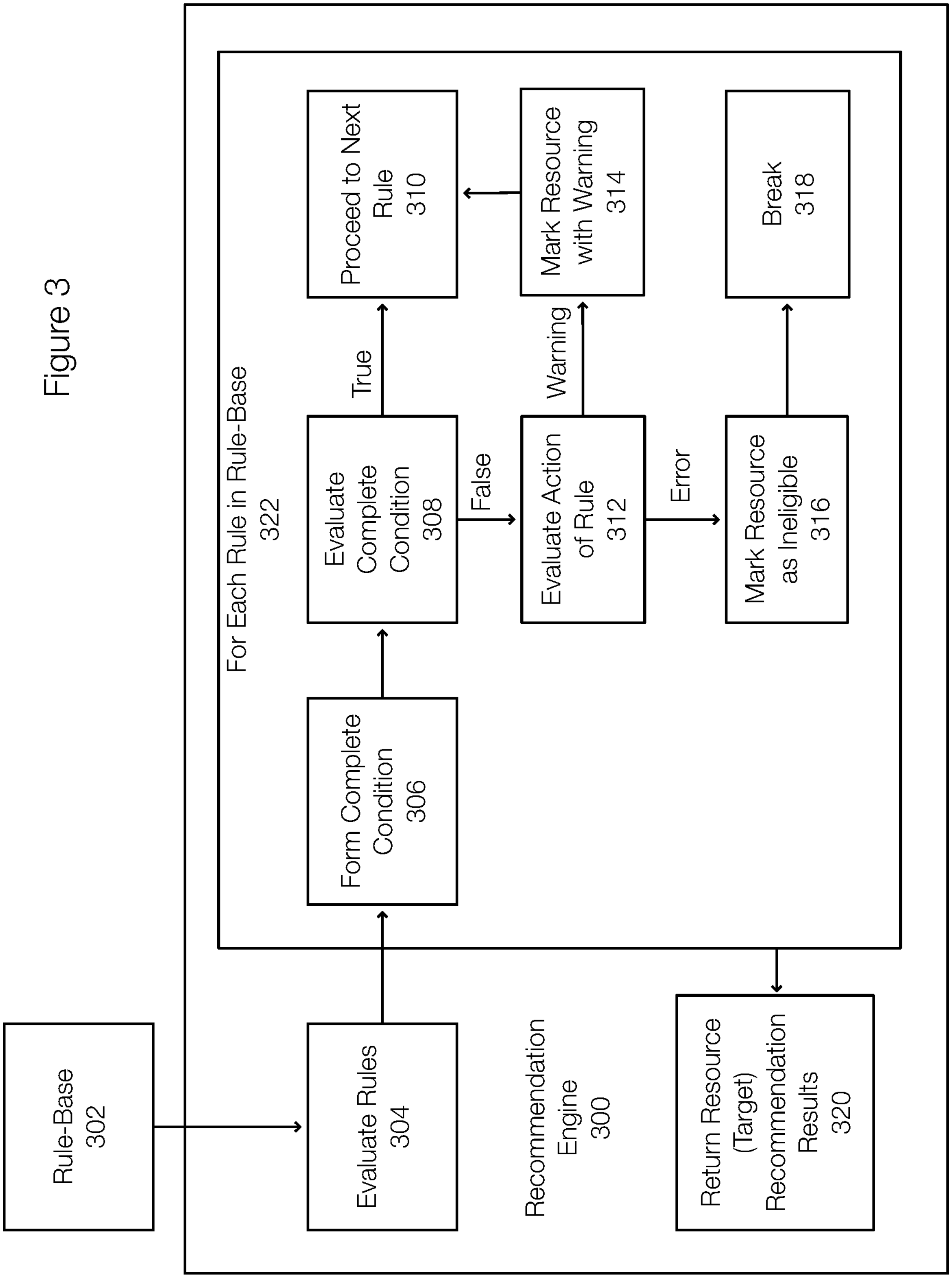
FIG. 3 discloses aspects of a recommendation engine and aspects of generating recommendations.

FIG. 3 discloses aspects of a recommendation engine and aspects of a method for recommending targets for a data protection operation. FIG. 3 illustrates a recommendation engine 300, which may be part of a service such as a migration and placement service. In this example, the recommendation engine 300 may receive or ingest a rule-base 302. The rule-base 302 may be user defined and may be sourced from various locations. For example, the rule-base 302 may be stored in a static location. Thus a user may cause the rule-base 302 to be written to that location such that the recommendation engine 300 can read the rule-base as needed. These examples of static locations may be beneficial when the rules do not change often or if the environment or use-case does not necessitate dynamic or user-configured rule-bases. Alternatively, the rule-base location may be defined in code.

The rule-base 302 may be passed to the recommendation engine 300. For example, the rule-base may be passed by accessing an application programming interface (API). Passing the rule-base 302 using an API offloads the configuration of the rule-base from the MPS. The MPS is also relieved of the responsibility of maintaining the rule-base. In addition, the system or user maintaining/updating/revising the rule-base 302 has immediate access to the rule-base. This allows the system or user to modify the rule-base as needed or as desired based on changing requirements. In one example, the user or system may include a service that utilizes the recommendations generated by the recommendation engine 300. Thus, the rule-base 302 becomes independent of or abstracted from the recommendation engine 300 such that the rule-base can be customized as needed by the user or system providing the rule-base.

In other examples, use case-specific plugin routines that use the recommendation engine 300 may not be configurable via an API request. Retrieving the rule-base 302 from outside of the MPS allows for further customization.

The recommendation engine 300 is configured to receive the rule-base 302 and evaluate (validate against targets) 304 the rules included in the rule-base 302. After evaluating 304 the rules, the recommendation engine may generate or return 320 resource or target recommendations. In other words, the recommendation engine 300 may return 320 results that includes a list of recommended targets that have been validated by the rule-base 302. The targets or resources identified in the results may represent a best fit for the rule-base 302 in some examples. A best fit, for example, may include a target that did not pass all of the rules but did not fail any rules that were disqualifying.

Evaluating 304 the rules may be performed as a loop where a validation operation is performed 322 for each rule in the rule-base 302. The rule-base 302 may be performed against each potential target. During the validation of the rules against a specific target, the recommendation engine may loop through the rules. If a rule fails in a disqualifying manner, the loop may break and proceed to the next target.

When validating the rule-base 302 against a specific target, a rule is retrieved from the rule-base 302 and a complete condition is formed 306. This may include parsing the rule to obtain the parameters and the condition needed to form the complete condition. The complete condition is evaluated 308. If the evaluation is true, then the method proceeds 310 to the next rule in the rule base 302.

If the rule is false, the action of the rule is evaluated 312. If the action is a warning, the resource or target is marked 314 with the warning and the method proceeds 310 to the next rule. If the action is an error (disqualifying), the resource is marked 316 as ineligible and the method breaks 218 and proceeds to the next target. In one example, the method may not break if there is a need to know all of the critical errors and warnings that apply to particular resource or target.

Thus, the rule-base 302 is validated for each of multiple targets. With reference to FIG. 1, for example, a recommendation or validation request may identify the storage pool 120. In this case, the rule-base 302 is evaluated against each of the storage units 122 and 124 in the storage pool 120. If the action of a rule is error when evaluating the rule-base in the context of the storage unit 122, then the method may mark the storage unit 122 as ineligible, break and proceed to validate the rule-base against the storage unit 124.

After the rules have been evaluated against the relevant targets (e.g., the storage unit 122 to 124), the recommendation engine 300 may return resource or target recommendation results 320. The results 320 may be a list of targets (e.g., storage units) that qualify as targets of a data protection operation (e.g., placement operation, migration operation) based on the rule-base 302. If the rule-base 302 is changed, the results 320 may also change.

Figure 4:
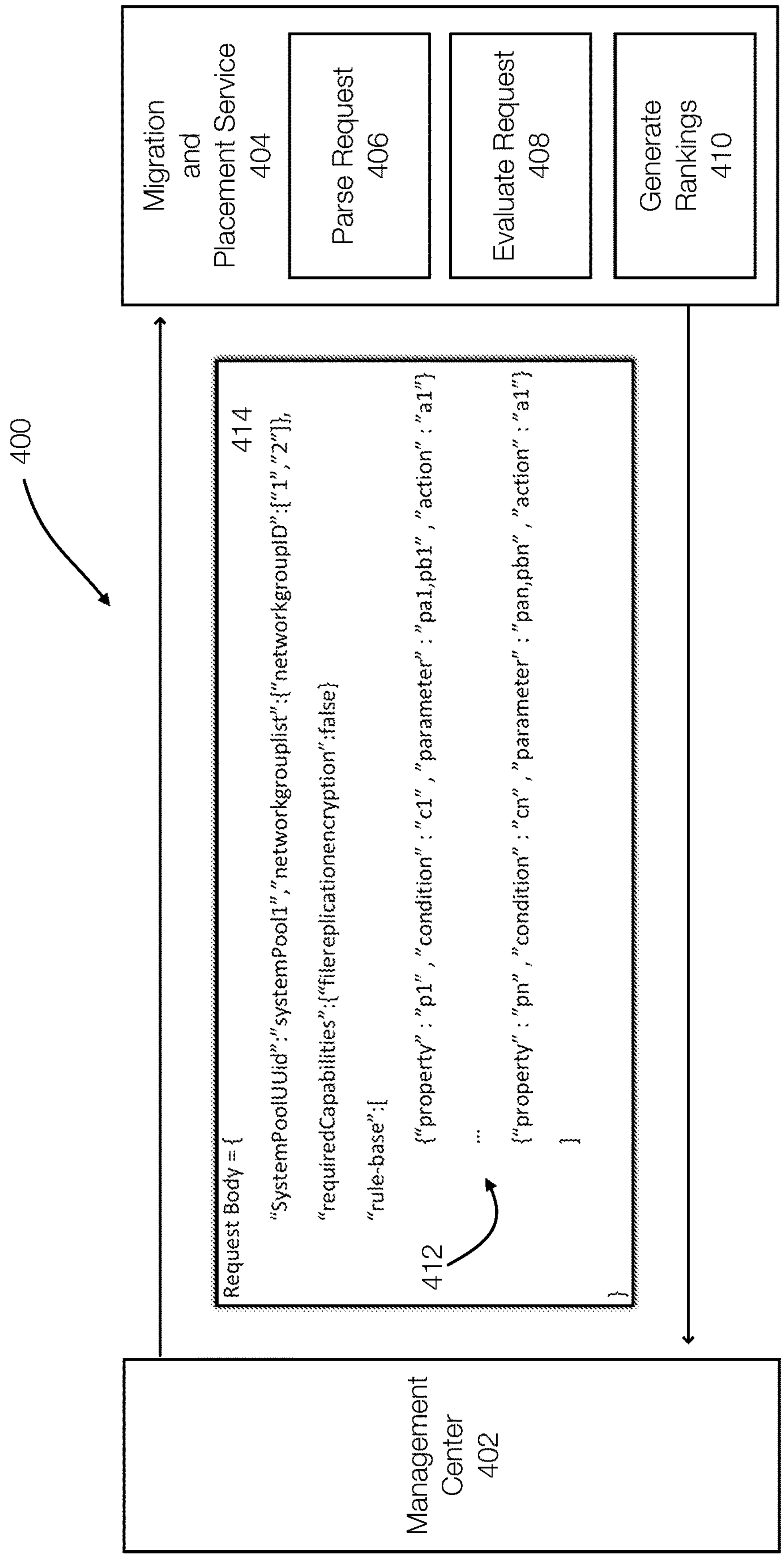
FIG. 4 discloses aspects of a request including a rule-base for a placement operation and discloses aspects of a placement workflow.

FIG. 4 discloses aspects of placing data in a storage system and more particularly illustrates a placement workflow. FIG. 4, more specifically, illustrates aspects of placing a dataset such as a backup or other logical file system at a target (e.g., a storage unit/system). In this example, a management center 402 generates a request 414 to place a dataset. When generating the request 414, information included in the request 414 may be retrieved from a location, received from a data protection system or other client or user, or the like. The management center 402 may invoke an API associated with the migration and placement service 404 to send the request 414 to the migration and placement service 414 (or more specifically to a recommendation engine).

The request 414 may include filter parameters such as a system pool UUID (pool identifier), a list of network group identifiers (group identifiers), an object containing required capabilities, and a rule-base 412. The workflow 400 is configured to identify eligible systems for placing the dataset and/or rank the eligible systems or targets. The pool identifier, group identifiers, and object may be used to generate a filtered list of possible targets (potential storage units) within a storage pool.

The request 414 may be adapted to include multiple pool identifiers or the like. For example, a request may be specific to a datacenter (e.g., the datacenter 110), to a specific pool of a datacenter, or the like.

The filtered list may be used by the migration and placement service 404 (or more specifically the recommendation engine). The rule-base 412 is validated against the targets in the filtered list. The recommendation engine is configured to evaluate the targets in the filtered list against the criteria defined by the rule-base 412. Any targets that pass the checks performed by the recommendation engine may be ranked, for example by available capacity. The eligible targets may be returned to the management center 402 and used in the data protection operation. In some cases, even targets that do not pass the checks performed by the recommendation engine may be ranked among those that did pass the checks, but marked as not recommended and tagged with an appropriate issue. Such cases might be necessary in situations where a consumer of the recommendations may be able to fix issues associated with a target such that they are marked as recommended on a subsequent request.

Thus, the request 414 is passed to the migration and placement service 404. The migration and placement service 404 may parse 406 the request 414. This may include extracting the properties, conditions, parameters, and/or actions. This may also include generating the complete condition.

Next, the request is evaluated 408. Data extracted from the request 414 may be passed to the recommendation engine. The recommendation engine evaluates target systems in the storage pool for placement eligibility based on the rule-base and/or additional request parameters. Thus, the targets in the identified storage pool are evaluated for placement eligibility based on the rule-base 412 and additional request parameters.

Rankings are generated 410 based on the results of the evaluation. The eligible targets may be ranked based on a characteristic such as available storage.

Figure 5:
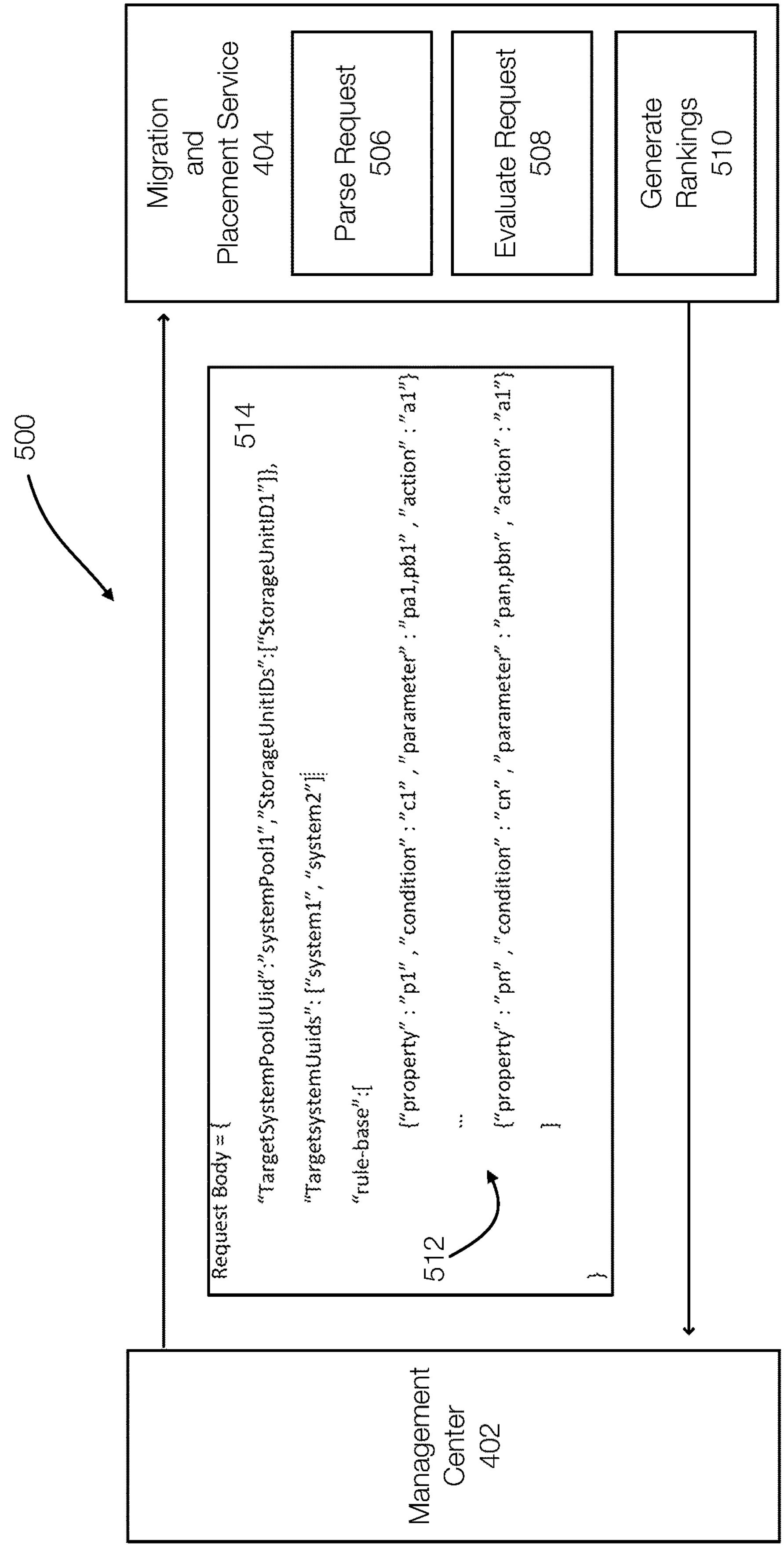
FIG. 5 discloses aspects of a request including a rule-base for a migration operation and discloses aspects of a migration workflow.

FIG. 5 discloses aspects of a migration workflow. The workflow 500 is similar to the workflow 400 in FIG. 4. One difference relates to contents of the request 514. In this example, values related to the source and the target may be included in the request 514. In this example, the request 514 includes a pool identifier (systempool1), a storage unit ID, and a list of target systems from the specified pool that have adequate privileges for migrating a dataset. Target systems in other pools could also be specified. The request 514 also includes a rule-base 512.

In this example, the storage unit ID specifies the source system where the dataset associated with the storage unit ID is stored. The target pool identifier and/or system identifiers are used as a filter to identify the storage units or the targets to be considered for the migration operation. Any of the target systems that pass the checks (are validated using the rule-base 512) performed by the migration and placement service 404 are ranked and returned to the management center 402.

In this example, the request 514 is parsed 506 as previously described. The request is then evaluated 508. In this example, the source and the target in the identified system pool are evaluated for migration eligibility based on the rule-base 512 and additional request parameters. Eligible targets may be ranked 510 by generating rankings based on varied criteria. In the context of migration, the eligible targets may be ranked by matching system model, matching required capabilities, and/or available capacity in that order of importance.

Figure 6:
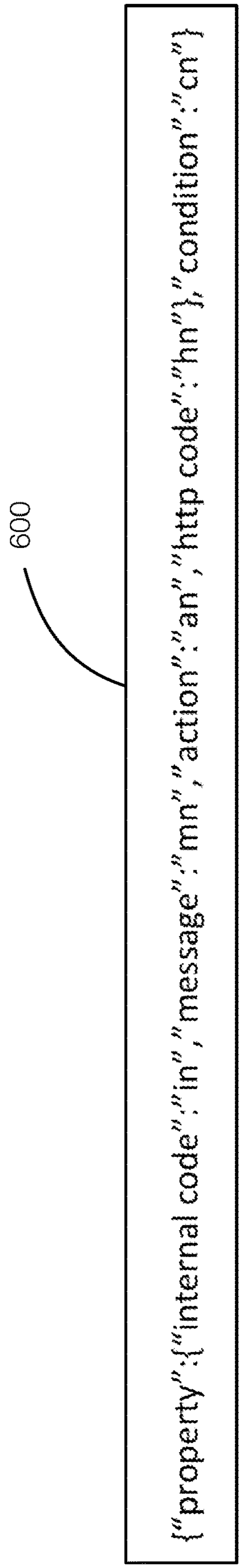
FIG. 6 discloses additional aspects of a rule.

FIG. 6 discloses additional aspects of rules. The rule 600 illustrates another example of a rule that may include a property structure that allows for richer, more dynamic issues to be returned based on different scenarios and circumstances. Rather than an enumeration or issue string for the defined property, the property may be represented as an object. The property object may contain an internal code denoting the issue, a message string describing the issue in greater detail, and an optional HTTP code. If the use case-specific plugin wrapping the recommendation engine requires a resulting HTTP response from the failure of the rule, including the HTTP code in the rule 600 helps to encapsulate all necessary behavior in the rule itself. In this extension to the rule format, the action could also be moved into the property object as the two fields are both related as to how a rule failure is handled.

Based on the example use cases for the rule-based recommendation validation, a rule containing an HTTP code could exclusively be paired with an ERR action. A rule containing an HTTP code paired with an ERR action would be handled by the recommendation engine in an identical manner as a rule without an HTTP code in one embodiment. However, the resulting response from the use case-specific plugin would be dictated by the presence of the HTTP code.

In another example, the parameter and condition inputs may be combined into one field, so that a user may specify the complete condition in the rule itself. This combination removes the need for additional matching logic in the recommendation engine and presents a more readable rule format for the user.

Embodiments of the invention allow a migration and placement service to generate a ranked list of target systems for a placement operation. The placement operation may place a dataset on any of the target systems in the ranked list. Typically, however, the highest ranked target is selected. Embodiments of the invention also relate to generating a ranked list of target systems for a migration operation. Embodiments of the invention, however, are not limited to these use-cases and may be implemented in computing systems that may use a rule-base for performing various types of operations. Example operations include backup operations, migration operations, placement operations, replication operations, snapshot operations, recovery operations, or the like.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, dataset placement operations, dataset migration operations, data protection operations, or the like.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. Embodiments of the invention may be implemented in PowerProtect Data Domain (PPDD) systems managed by PowerProtect Data Doman Management Center with multiple datasets, backups, logical file systems or portions thereof, Mtrees on each PPDD system. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers or virtual machines (VM), though no particular component implementation is required for any embodiment.

As used herein, the term 'data' or 'dataset' is intended to be broad in scope. Thus, that term embraces, by way of example and not limitation, backups, snapshots, namespaces, objects, segments, or the like. Data and datasets may also include data in different forms, files, and formats.

Example embodiments of the invention are applicable to any system capable of storing and handling various types of objects, in analog, digital, or other form.

As used herein, a 'backup' is an example of a dataset and is intended to be broad in scope. As such, example backups in connection with which embodiments of the invention may be employed include, but are not limited to, full backups, partial backups, clones, snapshots, and incremental or differential backups.

It is noted that any operation(s) of any of methods disclosed herein or in the Figures, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving a request that includes a rule-base and filter parameters and a service, wherein the request is associated with a data-related operation to be performed in a storage system, validating rules includes in the rule-base against targets in the storage system to identify validated targets for the data-related operations, wherein validated targets are included in a list of validated targets, returning the list of validated targets, and performing the data-related operation in the storage system.

Embodiment 2. The method of embodiment 1, wherein the data-related operation comprises a placement operation to place a dataset at a target in the storage system or a migration operation to move a dataset from a source in the storage system to the target in the storage system.

Embodiment 3. The method of embodiment 1 and/or 2, wherein the storage system includes a plurality of storage pools and where each of the storage pools includes a plurality of storage units, wherein the target is a storage unit.

Embodiment 4. The method of embodiment 1, 2, and/or 3, further comprising filtering the storage system based on the filter parameters to generate a filtered list of targets, wherein the filter parameters include a pool identifier, a group identifier, and capabilities and wherein the list of validated targets is generated from the filtered list of targets.

Embodiment 5. The method of embodiment 1, 2, 3, and/or 4, wherein validating the rules includes validating the rules against each of the targets in a filtered list of targets, wherein the filtered list of targets is based on the filter parameters in the request.

Embodiment 6. The method of embodiment 1, 2, 3, 4, and/or 5, further comprising, for each target in the filtered list of targets and for each rule: parsing the rule to extract a property, a condition, a parameter, and an action, forming a complete condition form the condition and the parameter, evaluating the rule against the target, wherein the target is included in the list of validated targets when the rule is true or when the rule is false with a warning, wherein the target is disqualified from inclusion in the list of validated targets when the rule fails with an error.

Embodiment 7. The method of embodiment 1, 2, 3, 4, 5, and/or 6, further comprising validating the rules included in the rule-base in a loop fashion against a target in the filtered list of targets, wherein a break occurs when a target fails with an error and the next target is validated.

Embodiment 8. The method of embodiment 1, 2, 3, 4, 5, 6, and/or 7, further comprising generating the rule-base, wherein the rule-base is generated external to the service and the storage system.

Embodiment 9. The method of embodiment 1, 2, 3, 4, 5, 6, 7, and/or 8, wherein the data-related operation is a migration operation and the filter parameters identify a source of the dataset stored in the storage system.

Embodiment 10. The method of embodiment 1, 2, 3, 4, 5, 6, 7, 8, and/or 9, further comprising ranking the list of validated targets based on available capacity when the data-related operation is a placement operation and based on one or more of system model, matching required capabilities, and available capacity when the data-related operation is a migration operation.

Embodiment 11. The method of embodiment 1, 2, 3, 4, 5, 6, 7, 8, 9, and/or 10, wherein invalid targets are included in the list are marked as not recommended, wherein the invalid targets are tagged with issues.

Embodiment 12. The method of embodiment 1, 2, 3, 4, 5, 6, 7, 8, 9, 10, and/or 11, further comprising remedying the issues.

Embodiment 13. A system, comprising hardware and/or software, operable to perform any of the operations, methods, or processes, or any portion of any of these, or any combination thereof disclosed herein.

Embodiment 14. A non-transitory storage medium having stored therein instructions that are executable by one or more hardware processors to perform operations comprising the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
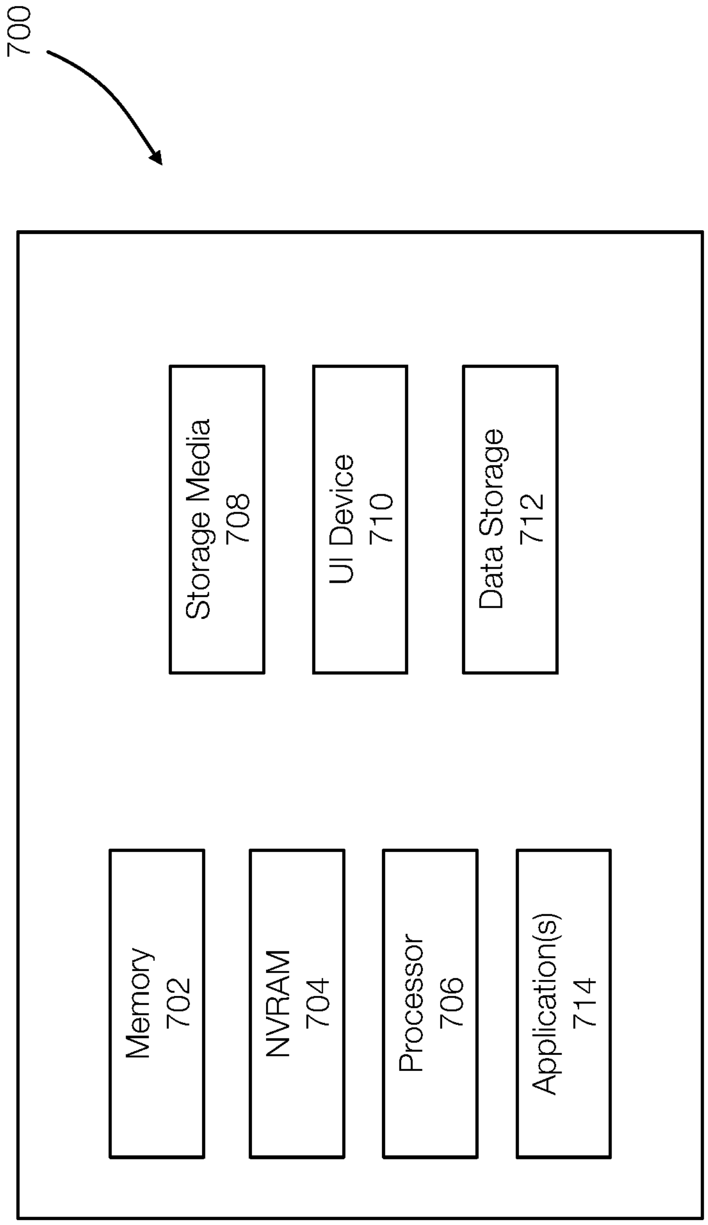
FIG. 7 discloses aspects of a computing device, system, or entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The physical device 700 may also be representative of an edge system, a cloud-based system, a datacenter or portion thereof, or other system or entity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving a request that includes a rule-base and filter parameters and a service, wherein the request is associated with a data-related operation to be performed in a storage system, wherein the storage system includes a plurality of storage pools and where each of the storage pools includes a plurality of storage units, wherein the storage units are targets;

filtering the storage system based on the filter parameters to generate a filtered list of targets, wherein the filter parameters include a pool identifier, a group identifier, and capabilities;

validating rules included in the rule-base against the targets in the storage system to identify validated targets for the data-related operations from the filtered list of targets, wherein the validated targets are included in a list of validated targets, wherein the list of validated targets is generated from the filtered list of targets;

returning the list of validated targets; and performing the data-related operation in the storage system, wherein the data-related operation comprises a placement operation to place a dataset at a target in the storage system or a migration operation to move a dataset from a source in the storage system to the target in the storage system.

2. The method of claim 1, wherein validating the rules includes validating the rules against each of the targets in a filtered list of targets, wherein the filtered list of targets is based on the filter parameters in the request.

3. The method of claim 2, further comprising, for each target in the filtered list of targets and for each rule:

parsing the rule to extract a property, a condition, a parameter, and an action;

forming a complete condition form the condition and the parameter;

evaluating the rule against the target, wherein the target is included in the list of validated targets when the rule is true or when the rule is false with a warning, wherein the target is disqualified from inclusion in the list of validated targets when the rule fails with an error.

4. The method of claim 3, further comprising validating the rules included in the rule-base in a loop fashion against a target in the filtered list of targets, wherein a break occurs when a target fails with an error and the next target is validated.

5. The method of claim 1, further comprising generating the rule-base, wherein the rule-base is generated external to the service and the storage system.

6. The method of claim 1, wherein the data-related operation is a migration operation and the filter parameters identify a source of the dataset stored in the storage system.

7. The method of claim 1, further comprising ranking the list of validated targets based on available capacity when the data-related operation is a placement operation and based on one or more of system model, matching required capabilities, and available capacity when the data-related operation is a migration operation.

8. The method of claim 7, wherein invalid targets are included in the list and marked as not recommended, wherein the invalid targets are tagged with issues.

9. The method of claim 8, further comprising remedying the issues.

10. A non-transitory storage medium having stored therein instructions that are executable by one or more hardware processors to perform operations comprising:

receiving a request that includes a rule-base and filter parameters and a service, wherein the request is associated with a data-related operation to be performed in a storage system, wherein the storage system includes a plurality of storage pools and where each of the storage pools includes a plurality of storage units, wherein the storage units are targets;

filtering the storage system based on the filter parameters to generate a filtered list of targets, wherein the filter parameters include a pool identifier, a group identifier, and capabilities;

validating rules included in the rule-base against the targets in the storage system to identify validated targets for the data-related operations from the filtered list of targets, wherein the validated targets are included in a list of validated targets, wherein the list of validated targets is generated from the filtered list of targets;

returning the list of validated targets; and performing the data-related operation in the storage system, wherein the data-related operation comprises a placement operation to place a dataset at a target in the storage system or a migration operation to move a dataset from a source in the storage system to the target in the storage system.

11. The non-transitory storage medium of claim 10, further comprising, for each target in the filtered list of targets and for each rule:

parsing the rule to extract a property, a condition, a parameter, and an action;

forming a complete condition form the condition and the parameter;

evaluating the rule against the target, wherein the target is included in the list of validated targets when the rule is true or when the rule is false with a warning, wherein the target is disqualified from inclusion in the list of validated targets when the rule fails with an error.

12. The non-transitory storage medium of claim 11, further comprising validating the rules included in the rule-base in a loop fashion against a target in the filtered list of targets, wherein a break occurs when a target fails with an error and the next target is validated.

13. The non-transitory storage medium of claim 10, further comprising generating the rule-base, wherein the rule-base is generated external to the service and the storage system.

14. The non-transitory storage medium of claim 10, wherein the data-related operation is a migration operation and the filter parameters identify a source of the dataset stored in the storage system.

15. The non-transitory storage medium of claim 10, further comprising ranking the list of validated targets based on available capacity when the data-related operation is a placement operation and based on one or more of system model, matching required capabilities, and available capacity when the data-related operation is a migration operation.

* * * * *